(12) United States Patent
Arakawa et al.

(10) Patent No.: US 8,213,563 B1
(45) Date of Patent: Jul. 3, 2012

(54) CONTROL ROD

(75) Inventors: Takayuki Arakawa, Hitachi (JP); Koichi Machida, Hitachi (JP); Norio Kawashima, Mito (JP); Kazuki Kobayashi, Hitachi (JP); Yoshiharu Kikuchi, Hitachi (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 1330 days.

(21) Appl. No.: 12/019,103

(22) Filed: Jan. 24, 2008

(30) Foreign Application Priority Data

Mar. 30, 2007 (JP) ................................ 2007-092862

(51) Int. Cl.
*G21C 7/00* (2006.01)

(52) U.S. Cl. ...................... 376/333; 376/327

(58) Field of Classification Search .......... 376/327–339, 376/219, 220, 207, 227, 226, 234; 976/DIG. 113–DIG. 123
See application file for complete search history.

(56) References Cited

U.S. PATENT DOCUMENTS

| | | | | |
|---|---|---|---|---|
| 4,861,544 A | * | 8/1989 | Gordon ........................ | 376/333 |
| 6,574,295 B2 | * | 6/2003 | Nakayama et al. ........... | 376/327 |
| 6,735,266 B1 | * | 5/2004 | Nakayama et al. ........... | 376/353 |
| 2003/0053581 A1 | * | 3/2003 | Gotoh et al. ................. | 376/327 |

FOREIGN PATENT DOCUMENTS

| | | |
|---|---|---|
| JP | 02-222868 | 9/1990 |
| JP | 8-105989 | 4/1996 |
| JP | 2002-257968 | 9/2002 |
| JP | 2006-153522 | 6/2006 |

* cited by examiner

*Primary Examiner* — Rick Palabrica
*Assistant Examiner* — Marshall O'Connor
(74) *Attorney, Agent, or Firm* — Antonelli, Terry, Stout & Kraus, LLP.

(57) ABSTRACT

A control rod includes a tie-rod, a handle mounted to an upper end portion of the tie-rod, either a connector plate or a fall velocity limiter mounted to a lower end portion of the tie-rod, sheaths having a U-shaped cross-section, welded intermittently to the tie-rod at a plurality of locations in the axial direction of the tie-rod, and having an upper end welded to the handle and a lower end welded to either the connector plate or the fall velocity limiter, and a neutron absorbing member disposed inside each of the sheaths. An upper end of a weld portion located at uppermost position in an axial direction of the tie-rod among a plurality of weld portions between the tie-rod and the sheath is disposed at a position within a range between 0.8 and 13% of total axial length Ls of the sheath below an upper end of the sheath.

8 Claims, 5 Drawing Sheets

CONTROL ROD

CLAIM OF PRIORITY

The present application claims priority from Japanese application serial no. 2007-092862, filed on Mar. 30, 2007, the content of which is hereby incorporated by reference into this application.

BACKGROUND OF THE INVENTION

The present invention relates to a control rod, and more particularly, to a control rod ideally applicable for a boiling water reactor to control reactor power.

The structure of conventional control rods used in a boiling water reactor and installation environments will be described. The boiling water reactor is equipped with a reactor core, which is loaded with a plurality of fuel assemblies, in the reactor pressure vessel. Uranium 235 contained in nuclear fuel material included in the fuel assemblies absorbs neutrons and generates nuclear fission, thereby generating heat. Reactor water (cooling water) supplied in the core is heated by the heat and boils, and some part of the water turns into steam. In the core, neutrons newly generated by the above-mentioned nuclear fission cause another uranium 235 to fission, thereby generating a chain reaction.

To control the amount of chain reactions of nuclear fission, control rods including neutron absorbers therein are utilized. Among those, a control rod normally used in a boiling water reactor has a crucial cross-section and is inserted into a gap (saturated water area) formed among each channel box contained in four fuel assemblies. One control rod is disposed per cell including four fuel assemblies. A control rod guide tube is disposed below the four fuel assemblies for almost each cell. The control rod guide tube is disposed in the reactor pressure vessel. One control rod uses each channel box contained in four fuel assemblies in a cell and the control rod guide tube as guide members. Furthermore, the lower end portion of the control rod is connected to a control rod drive mechanism, and the control rod is inserted into the reactor core by the operation of the control rod drive mechanism and then withdrawn from the reactor core. The control rod is an important device used for controlling reactivity and regulating power distribution.

The structure of the conventional control rod used in the boiling water reactor will be described briefly. The control rod has a handle, a tie-rod, a fall velocity limiter and four blades. The handle is welded to an upper end portion of the tie-rod. The fall velocity limiter is welded to a lower end portion of the tie-rod. The four blades extend in four directions from the tie-rod located in the central axis of the control rod. Each blade has a U-shaped sheath mounted to the tie-rod, and a plurality of neutron absorbing rods that contain neutron absorbers are disposed inside the sheath (see Japanese Patent Laid-open No. 2002-257968). Japanese Patent Laid-open No. 2002-257968 further describes that a plurality of projecting portions are formed on the end face of the sheath in the axial direction of the sheath, and those projecting portions are welded to the tie-rod by laser welding. By providing projecting portions, the sheath is intermittently welded to the tie-rod in the axial direction. Furthermore, another well-known control rod is structured such that a hafnium plate, instead of a neutron absorbing rod, is disposed in the U-shaped sheath welded to the tie-rod (see Japanese Patent Laid-open No. Hei 8 (1996)-105989 and Japanese Patent Laid-open No. 2006-153522).

SUMMARY OF THE INVENTION

However, recently, phenomena have been reported in that micro cracks occurred in the sheath of the control rod used in a boiling water reactor. If a crack occurred in the sheath lengthens toward the tie-rod, there is a possibility that the crack may reach into the tie-rod which is an axis of the control rod located at the center of the control rod and a very important member with respect to the strength. The generation of crack in the tie-rod must be avoided.

It is an object of the present invention to provide a control rod which can prevent a tie-rod from cracking.

The present invention for attaining the above object is characterized in that among a plurality of weld portions between a tie-rod and a sheath, an upper end of the weld portion located at an uppermost position in the axial direction of the tie-rod is disposed at a position within the range between 0.8 and 13% of total axial length Ls of the sheath below an upper end of the sheath.

Because the upper end of the weld portion located at the uppermost position is disposed at a position within the range between 0.8 and 13% of the total axial length Ls of the sheath below the upper end of the sheath, in case a crack that has occurred at a location in which tensile residual stress in the upper end portion of the sheath becomes maximum lengthens in the direction perpendicular to the axial core of the tie-rod, the crack reaches the tie-rod-side end face of the sheath above the upper end of the weld portion located at the uppermost position. That is, that crack will not reach the weld portion located at the uppermost position. Therefore, it is possible to prevent a tie-rod from cracking resulting from a crack occurred in the sheath.

It is preferable that the upper end of the above-mentioned weld portion located at the uppermost position is disposed at a position within the range between 4 and 13% of the total axial length Ls of the sheath below the upper end of the sheath.

According to the present invention, it is possible to prevent a tie-rod used in the control rod from cracking.

BRIEF DESCRIPTION OF THE DRAWINGS

FIG. 1A is an enlarged side view showing the upper end portion of the blade and its vicinity; FIG. 1B is a sectional view taken along a line I-I of FIG. 1A

FIG. 4A is an enlarged side view showing the upper end portion of the blade and its vicinity; FIG. 4B is a sectional view taken along a line IV-IV of FIG. 4A

FIG. 5A is an enlarged side view showing the upper end portion of the blade and its vicinity; FIG. 5B is a sectional view taken along a line V-V of FIG. 5A

DETAILED DESCRIPTION OF THE PREFERRED EMBODIMENTS

Inventors found out the cause of a crack that occur in a sheath of a control rod and newly invented a structure of a control rod which can prevent the crack from reaching into a tie-rod. The cause of the crack the inventors found out will be described below.

Figure 4A:
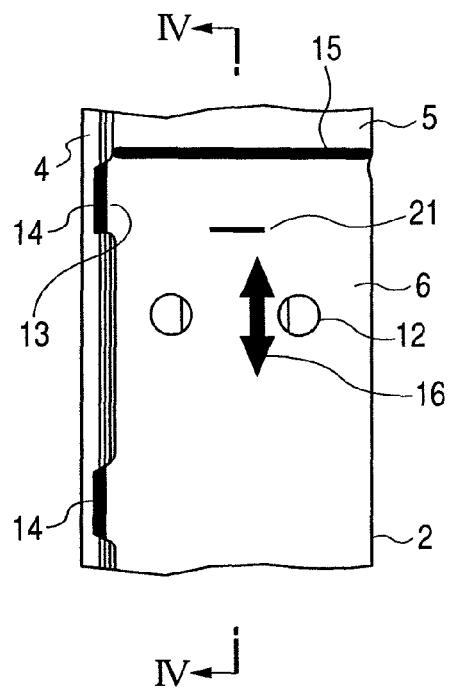
FIGS. 4A and 4B are structural diagrams showing upper end portion of a blade of a conventional control rod.
Figure 4C:
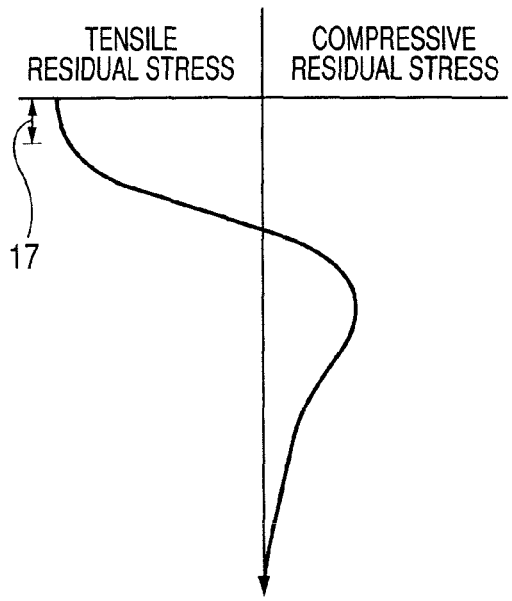
FIG. 4C is an explanatory drawing showing residual stress distribution in an upper end portion of a sheath of the conventional control rod in the axial direction of the tie-rod.
Figure 4B:
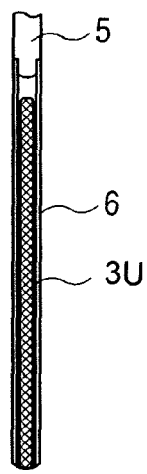

A conventional control rod used in a boiling water reactor has a crucial cross-section and is equipped with four blades 2 extending in four directions from a tie-rod 4 as shown in FIGS. 4A and 4B. A handle 5 is fixed on an upper end portion of the tie-rod 4. A sheath 6 has a U-shaped cross-section, and a plurality of tabs 13 are formed on an end portion of the sheath 6 in an axial direction of the sheath 6. Those tabs 13 are welded to the tie-rod 4. An upper end portion of the sheath 6 is welded to the handle 5. Number 14 denotes a weld portion between the tab 13 and the tie-rod 4, and number 15 denotes a weld portion between the sheath 6 and the handle 5. A hafnium member 3 being a neutron absorber is disposed in the sheath 6 and mounted to the handle 5. A plurality of apertures 12 which introduce a coolant inside are formed on the sheath 6.

Recently, phenomena have been reported in that micro crack occurred in the sheath of the control rod used in a boiling water reactor (BWR). This crack 21 occur in the vicinity of the weld portion 15 as shown in FIG. 4A. The inventors investigated the cause of the crack 21. The results will be described below.

Figure 1A:
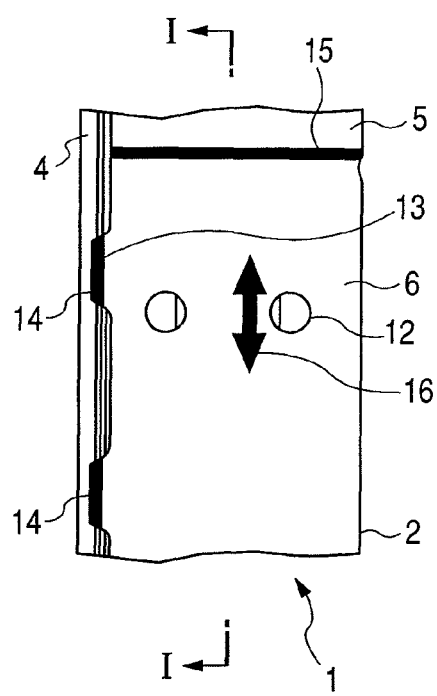
FIGS. 1A and 1B are structural diagrams showing upper end portion of a blade of a control rod according to embodiment 1 shown in FIG. 2.
Figure 5A:
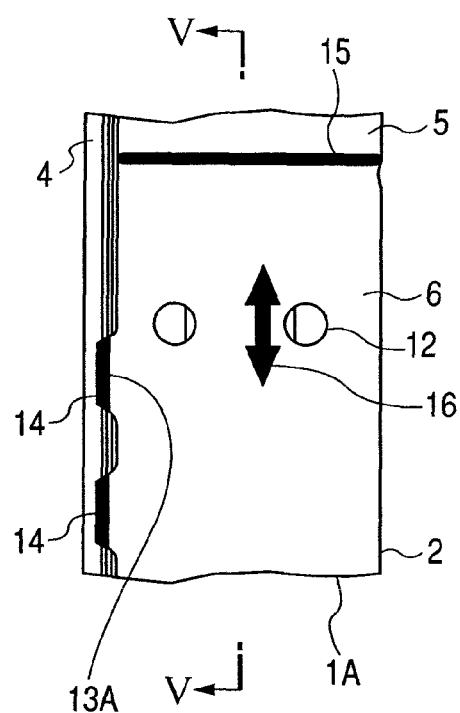
FIGS. 5A and 5B are structural diagrams showing upper end portion of a blade of a control rod according to embodiment 2 which is another embodiment of the present invention.

It is considered that the crack 21 is an irradiation-assisted stress corrosion cracking (IASCC) which occurs when three factors of stress, corrosion, and radiation are superimposed at the same time. In the vicinity of the weld portion 15, a narrow gap is formed between the hafnium member and the sheath wherein the above three factors exist, which creates an environment in which the crack tends to occur. The inventors investigated a stress distribution in the vicinity of the weld portion 15 and found out that the tensile residual stress resulting from the welding to join a handle 5 and a sheath 6 in the upper end portion of the sheath 6 has been increased (see FIG. 4C). The inventors considered that the crack 21 occurred in the upper end portion of the sheath 6 due to the influence of the tensile residual stress. Specifically, the investigation of the location of the crack 21 revealed that the crack 21 concentrated at a position 17 where tensile residual stress is maximum (see FIG. 4C). Because a tensile force resulting from tensile residual stress operates in the direction of the double headed arrow 16 (the axial direction of the tie-rod 4), as shown in FIGS. 1A, 4A and 5A, the crack 21 lengthens in the direction perpendicular to the axial core of the tie-rod 4. However, even if this crack 21 occurs, the soundness of the control rod is not affected. This conclusion is brought by the fracture mechanics assessment which indicates that the growth of the crack 21 stops before they reach the tie-rod 4 due to the influence of the compressive residual stress that intermittently occurs in the weld portion 14 in the axial direction.

Furthermore, an IASCC can be avoided by eliminating one of three factors, which are stress, corrosion, and irradiation; for example, by eliminating tensile residual stress. Generally, there is a method for reducing tensile residual stress by applying thermal treatment after the welding. However, it is difficult to apply this method to a control rod because of its structure, and the thermal treatment of the control rod causes a dimension error to occur. Therefore, it is difficult to apply this method to a control rod which is subject to strict dimension tolerance.

As stated above, even if the crack 21 occur in the upper end portion of the sheath 6, there is no possibility that the crack 21 lengthens into the tie-rod 4 due to the influence of compressive residual stress in the weld portion 14. However, to increase the safety of the control rod, the inventors invented a structure of a control rod which unfailingly stops the growth of the cracks 21 into the tie-rod 4. That is, the inventors invented a structure in which a weld portion 14 located at the uppermost position is located below the position 17 at which tensile residual stress is maximum based on the characteristics of the stress distribution in the upper end portion of the sheath 6 shown in FIG. 4C. As the result of the investigation of the crack 21 occurred in the upper end portion of the sheath 6, this crack 21, which is present at the lowermost position within the range of the position 17, is occurring at a position 0.75% of the total length of the sheath 6 in the axial direction of the sheath 6 below the upper end of the sheath 6. For this reason, in view of the safety, the inventors invented a structure in which the upper end of the weld portion located at the uppermost position among a plurality of weld portions between the tie-rod and the sheath is disposed at a position within the range between 0.8 and 13% of the total axial length of the sheath below the upper end of the sheath in the axial direction of the tie-rod. In other words, the upper end of the tab (projecting portion), welded to the tie-rod, located at the uppermost position is disposed at a position within the range between 0.8 and 13% of the total axial length of the sheath below the upper end of the sheath. In the case in which the upper end of the above-mentioned weld portion located at the uppermost position is located at a position of 0.8% or more of the total axial length of the sheath below the upper end of the sheath in the axial direction of the tie-rod, even if crack 21 that occurred in the upper end portion of the sheath 6 lengthens in the direction perpendicular to the axial core of the tie-rod 4, the crack 21 will not reach the weld portion 14 connected to the tie-rod 4. Therefore, it is possible to unfailingly prevent the tie-rod 4 from cracking as the result of the growth of the crack 21. Furthermore, since the upper end of the above-mentioned weld portion located at the uppermost position is located 13% of the total axial length of the sheath, at a maximum, below the upper end of the sheath in the axial direction of the tie-rod, it is possible to satisfy the strength of the sheath required with regard to the earthquake-resistance. In the case in which the upper end of the above-mentioned weld portion located at the uppermost position is located at a position more than 13% of the total axial length of the sheath below the upper end of the sheath in the axial direction of the tie-rod, it is not possible to ensure the required earthquake-resistance capacity.

Embodiments of a control rod configured as mentioned above will be described below.

Embodiment 1

A control rod according to embodiment 1 which is a preferred embodiment of the present invention will be described with reference to FIGS. 1 to 3. A control rod 1 in the present embodiment is used in a boiling water reactor. The control rod 1 has a crucial cross-section. The control rod 1 is provided with a tie-rod 4 disposed in the axial core of the control rod 1, and four blades 2 extend in four directions from the tie-rod 4. A handle 5 is fixed to an upper end portion of the tie-rod 4, and a connector plate 8 is fixed to a lower end portion of the tie-rod 4. Rollers 18 are rotatably mounted to the connector plate 8. The roller 18 comes in contact with the outer surface of a channel box of a fuel assembly loaded in the core, and the roller 18 functions to allow the control rod 1 to move smoothly among the fuel assemblies.

Figure 3:
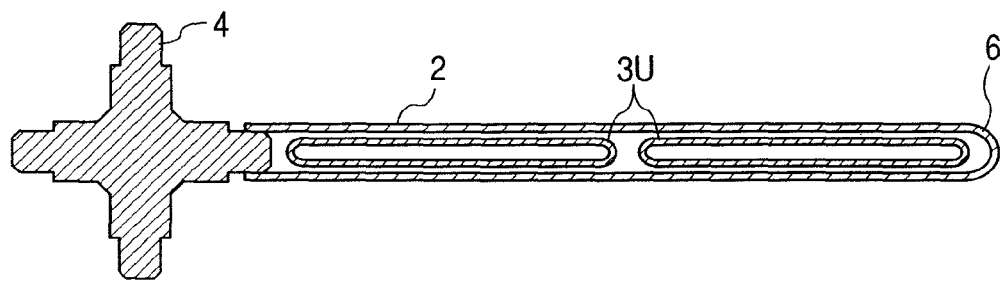
FIG. 3 is a sectional view taken along a line III-III of FIG. 2.

Each blade 2 includes a sheath 6 having the cross-section of which is U-shaped and hafnium members 3U,3L which are flat tubes (see FIG. 3). The sheath 6 is made of stainless steel (SUS304 and SUS316L, or the like). An upper end of the sheath 6 is welded to the handle 5, a lower end of the sheath 6 in the axial direction of the tie-rod 4 is welded to the connector plate connector plate 8. A plurality of tabs (projecting portions) 13 are formed on both U-shaped end portions of the sheath 6 in its axial direction with predetermined intervals. The tabs 13 are a part of the sheath 6 which protrude toward the tie-rod 4. Those tabs 13 are welded to the tie-rod 4 to form weld portions 14 (see FIG. 1A). The weld portion 14 is formed along the total length of the tab 13 in the axial direction of the tie-rod 4. The length of the weld portion 14 in the axial direction of the tie-rod 4 can be shorter than the total length of the tab 13. A plurality of apertures 12 are formed by penetrating the sheath 6. The connections between the sheath 6 and the tie-rod 4, handle 5, and the connector plate 8 are made, for example, by laser welding.

Two hafnium members 3U and two hafnium members 3L are disposed in a space formed inside the sheath 6. The hafnium members 3U are located above the hafnium members 3L. Upper end portions of the hafnium members 3U are mounted to the handle 5, and the hafnium members 3L are mounted to the connector plate 8. Those hafnium members are neutron absorbing members. The gap located between a lower end of the hafnium member 3U and an upper end of the hafnium member 3L is of a minimum width within the range in which the hafnium members do not come in contact with each other when the hafnium members 3U,3L become thermally-expanded while the boiling water reactor is in operation. In FIG. 2, Ls denotes total axial length of the sheath 6, and Lc denotes effective length of the neutron absorber of the control rod 1 (the length from the lower end of the hafnium member 3L to the upper end of the hafnium member 3U).

Control rods 1 are disposed in the reactor pressure vessel of a boiling water reactor and inserted into and withdrawn from a core loaded with a plurality of fuel assemblies so as to control reactor power. The control rod 1 is connected to a control rod drive mechanism disposed at the bottom of the reactor pressure vessel by a connector 19 located in the lower end portion of the connector plate 8. The control rod drive mechanism operates to insert a control rod 1 into the core and withdraw the control rod 1 from the core. Cooling water flowing in the reactor pressure vessel flows into the sheath 6 through some apertures 12 to cool the hafnium members 3U,3L and then flows out from the sheath 6 from other apertures 12. Cooling water flowing into the sheath 6 flows into the hafnium members 3U through an aperture 10 having a small diameter provided in the hafnium members 3U, and then flows into the hafnium members 3L through an aperture 11 having a small diameter provided in the hafnium members 3L. Thus, as the result of the inflow of the cooling water into the hafnium members 3U,3L, cooling effects of the hafnium members are increased.

Figure 1C:
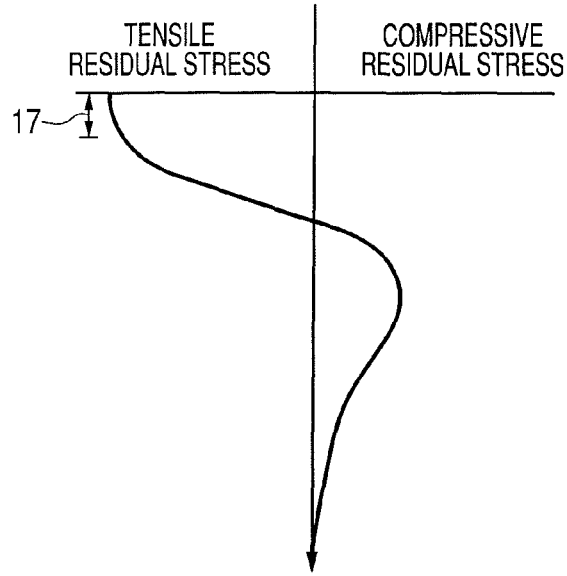
FIG. 1C is an explanatory drawing showing residual stress distribution in an upper end portion of a sheath of the control rod according to embodiment 1 in the axial direction of the tie-rod.
Figure 1B:
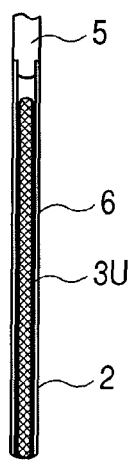
Figure 2:
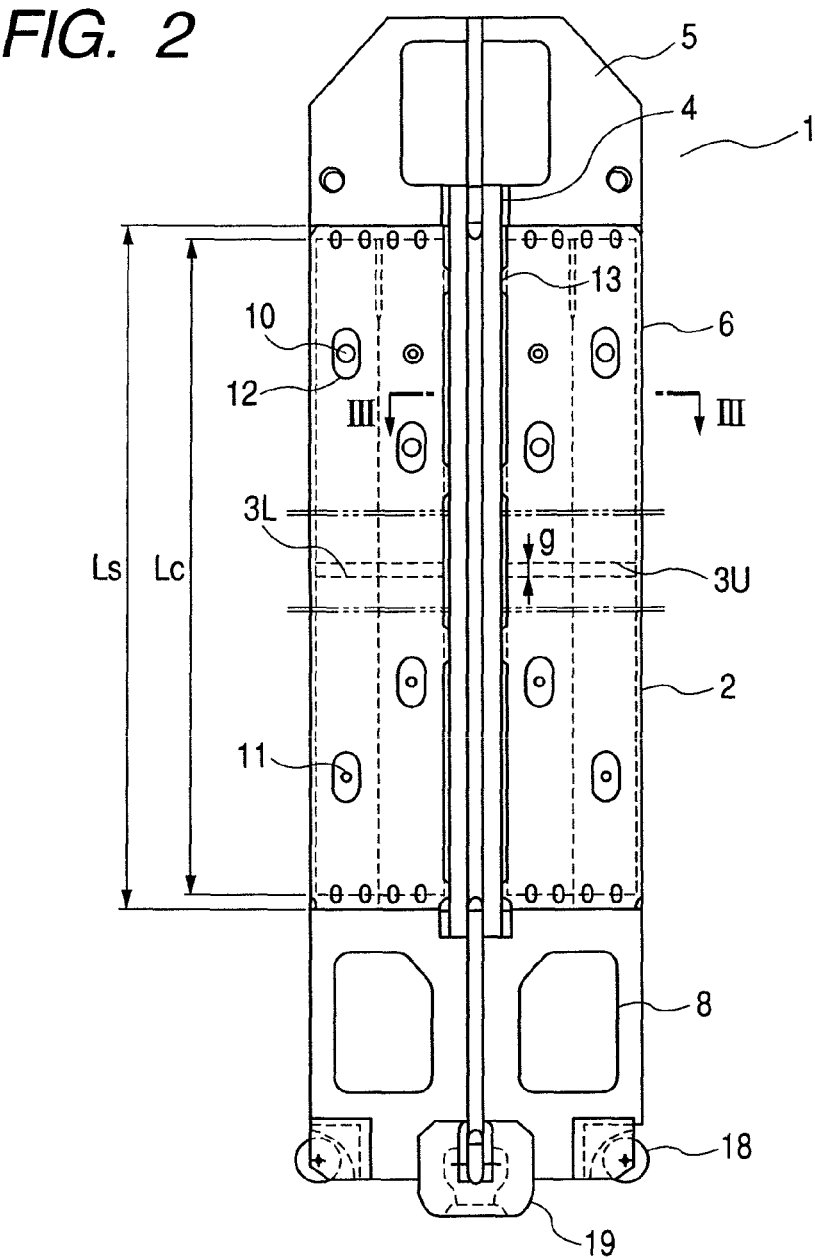
FIG. 2 is a side view showing a control rod according to embodiment 1 which is a preferred embodiment of the present invention.

The distribution of residual stress that occurs around the upper end portion of the sheath 6 due to the welding between the handle 5 and the sheath 6 is as shown in FIG. 1C. Tensile residual stress occurs near the weld portion 15. In the axial direction of the tie-rod 4, compressive residual stress occurs at a position downwardly away from the position 17 at which tensile residual stress is maximum. A crack 21 occurs at the position 17 at which tensile residual stress is maximum. In the control rod 1 of the present embodiment, the tab 13 (specifically, an upper end of the tab 13) located at the uppermost position in the axial direction of the tie-rod 4, in other words, the weld portion 14 (specifically, an upper end of the weld portion 14) located at the uppermost position is located below the position 17 at which tensile residual stress is maximum as shown in FIG. 1A. That is, the upper end of the tab 13 located at the uppermost position is disposed at a position within the range between 0.8 and 13% of the total axial length Ls of the sheath 6 in the axial direction of the tie-rod 4 below the upper end of the sheath 6. For example, in the control rod 1, the tab 13 located at the uppermost position, that is, the upper end of the weld portion 14 is located at a position 2.0% of the total axial length Ls of the sheath 6 below the upper end of the sheath 6 in the axial direction of the tie-rod.

In the control rod 1, since the tab 13 located at the uppermost position is disposed as mentioned above, even if a crack 21 that occurred within the position 17 in the sheath 6 lengthens in the direction perpendicular to the axial core of the tie-rod 4, the crack 21 reaches the end face of the sheath 6 in the direction perpendicular to the axial core of the tie-rod 4 at a position upwardly away from the weld portion 14. That is, even if the crack 21 advances in the direction perpendicular to the axial core of the tie-rod 4, the crack will not reach the weld portion 14. Therefore, it is possible for the control rod 1 to prevent the tie-rod 4 from cracking resulting from the crack 21 that occurred in the sheath 6. The present embodiment is capable of significantly increasing the safety of the tie-rod 4, thereby increasing the safety of the control rod 1 significantly.

Embodiment 2

Figure 5C:
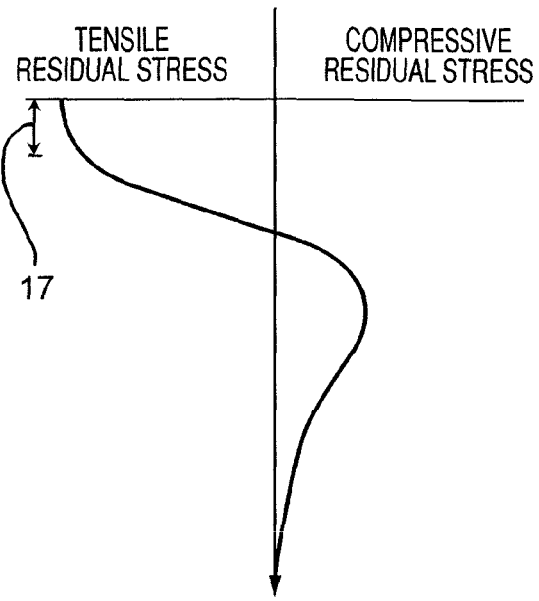
FIG. 5C is an explanatory drawing showing residual stress distribution in an upper end portion of a sheath of the control rod according to embodiment 2 in the axial direction of the tie-rod.
Figure 5B:
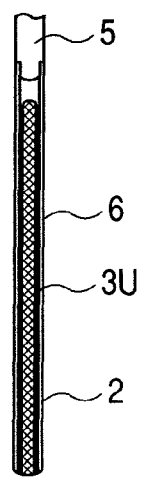

A control rod according to embodiment 2 which is another embodiment of the present invention will be described with reference to FIG. 5. In the control rod 1A of the present embodiment, the position of the tab located at the uppermost position is different from that of the control rod 1, but other structures of the control rod 1A are the same as those of the control rod 1.

In a control rod 1A of the present embodiment, the tab 13A (specifically, the upper end of the tab 13A) located at the uppermost position in the axial direction of the tie-rod 4, in other words, the weld portion 14 (specifically, the upper end of the tab 13A) located at the uppermost position is disposed at a position at which residual stress is not tensile residual stress as shown in FIG. 5A. With regard to residual stress that occurs in the sheath 6, tensile residual stress disappears at a position 4% of the total axial length of the sheath 6 below the upper end of the sheath 6. At a position 4% or more below the upper end of the sheath 6, residual stress becomes compressive residual stress. Based on these results, in the control rod 1A, the upper end of the tab 13A located at the uppermost position is disposed at a position within the range between 4 and 13% of the total axial length Ls of the sheath 6 below the upper end of the sheath 6 in the axial direction of the tie-rod 4. For example, in the control rod 1A, the tab 13A located at the uppermost position, that is, the upper end of the weld portion 14 is located at a position 10% of the total axial length Ls below the upper end of the sheath 6 in the axial direction of the tie-rod 4.

In the control rod 1A, since the tab 13A located at the uppermost position is disposed as mentioned above, this tab 13A is disposed at a position where compressive residual stress occurs in the axial direction of the sheath 6. For this reason, even if a crack 21 that occurred within the position 17 in the sheath 6 lengthens in the direction perpendicular to the axial core of the tie-rod 4, the crack 21 reaches the end face of the sheath 6 in the direction perpendicular to the axial core of the tie-rod 4 at a position upwardly away from the weld portion 14. That is, even if the crack 21 lengthens in the direction perpendicular to the axial core of the tie-rod 4, the crack will not reach the weld portion 14. Therefore, it is possible for the control rod 1A to prevent the tie-rod 4 from cracking resulting from the crack 21 that occurred in the sheath 6. The present embodiment is capable of significantly increasing the safety of the tie-rod 4, thereby increasing the safety of the control rod 1A significantly.

Embodiment 3

Figure 6:
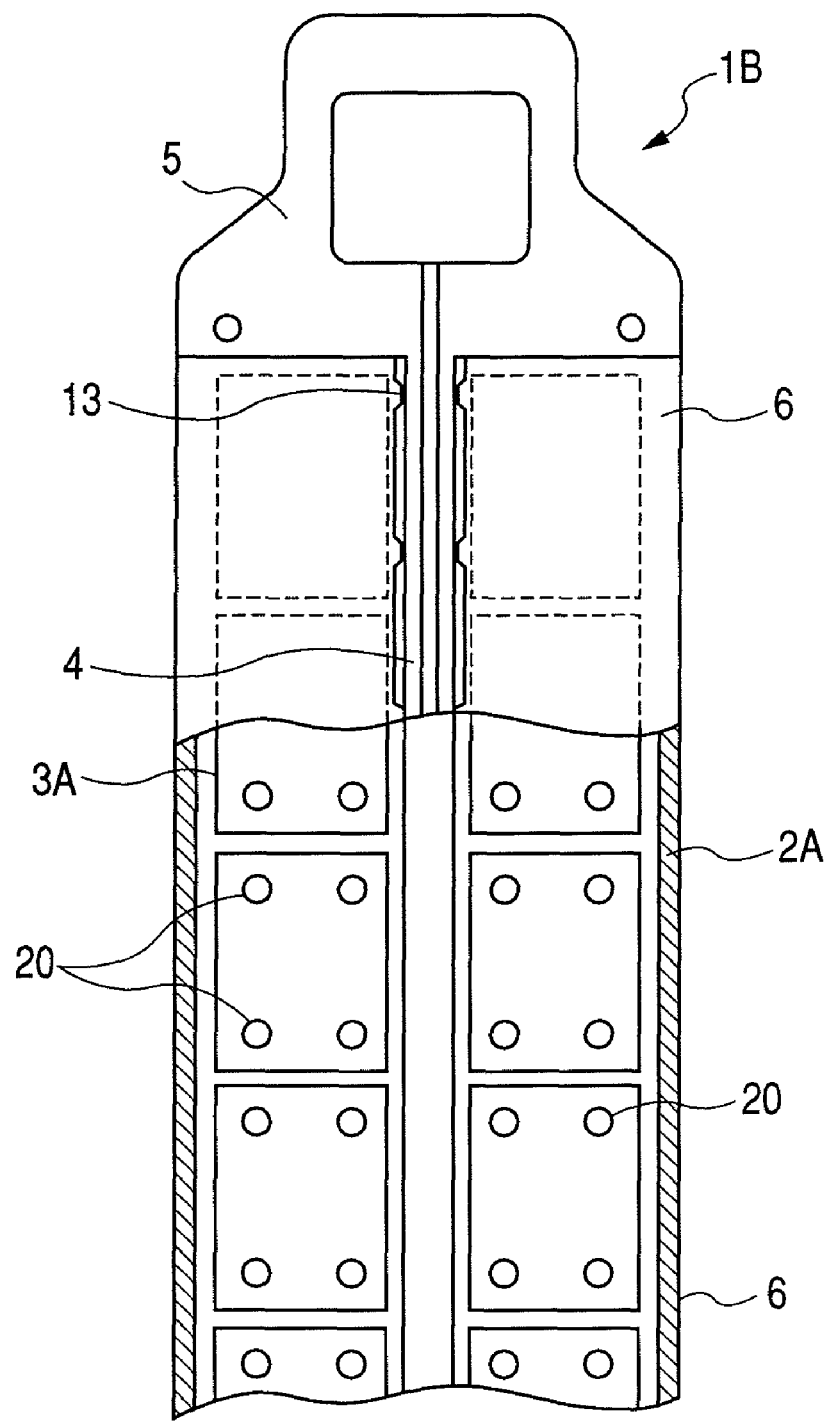
FIG. 6 is a structural diagram showing an upper part of a control rod according to embodiment 3 which is another embodiment of the present invention.

A control rod according to embodiment 3 which is another embodiment of the present invention will be described with reference to FIG. 6. In the control rod 1B of the present embodiment, the shape of the hafnium members and their installation structure are different from those of the control rod 1. Other structures of the control rod 1B are the same as those of the control rod 1. The difference between the control rod 1B and the control rod 1 will be described in detail.

The control rod 1B also has a crucial cross-section. The control rod 1B is equipped with four blades extending in four directions 2A from the tie-rod 4. With regard to the blade 2A, eight pairs of plate-like hafnium members 3A, facing each other, are disposed in the axial direction inside the sheath 6 having a U-shaped cross-section. For example, a pair of hafnium members 3A that face each other are immobilized onto each of the side walls of the sheath 6 that face each other by immobilizing members 20. Four immobilizing members 20 are disposed by penetrating the vicinity of each of four corners of a pair of hafnium members 3A.

A handle 5 is fixed to an upper end portion of the tie-rod 4, and the connector plate 8, not shown, is fixed to a lower end portion of the tie-rod 4. In the control rod 1B, a plurality of tabs (projecting portions) 13 are formed on both U-shaped end portions of the sheath 6 with predetermined intervals in the axial direction. Those tabs 13 are, for example, welded to the tie-rod 4 by laser welding. The sheath 6 is welded in the same manner as the control rod 1, and the handle 5 and the connector plate 8 are welded, for example, by laser welding.

In the control rod 1B, the tab 13 located at the uppermost position, that is, the weld portion 14 located at the uppermost position (not shown in FIG. 5) is disposed at a position lower than the position 17 at which tensile residual stress is maximum as in the same manner as embodiment 1. That is, the tab 13 located at the uppermost position is disposed at a position within the range between 0.8 and 13% of the total axial length Ls of the sheath 6 below the upper end of the sheath 6 in the axial direction of the tie-rod 4. For example, in the control rod 1B, the tab 13 located at the uppermost position, that is, the upper end of the weld portion 14 is disposed at a position 2.0% of the total axial length Ls below the upper end of the sheath 6 in the axial direction of the tie-rod.

In the control rod 1B, even if a crack 21 that occurred within the position 17 in the sheath 6 lengthens in the direction perpendicular to the axial core of the tie-rod 4, it is possible for the control rod 1B to prevent the tie-rod 4 from cracking in the same manner as the control rod 1. The safety of the control rod 1B is significantly increased.

In the control rod 1B, in the same manner as embodiment 2, it is possible to dispose the tab 13 located at the uppermost position, that is, the weld portion 14 at a position within the range between 4 and 13% of the total axial length Ls of the sheath 6 below the upper end of the sheath 6 in the axial direction of the tie-rod 4.

Embodiment 4

A control rod according to embodiment 4 which is another embodiment of the present invention will be described.

In a control rod 1 according to embodiment 1, since the weld portion 14 located at the uppermost position is downwardly away from the weld portion 15 further than the position in the conventional control rod, there is a possibility that the position 17 at which tensile residual stress is maximum may also move downward. To avoid this phenomenon, it is possible to locate the position 17 at which tensile residual stress is maximum close to the weld portion 15 by controlling quantity of heat absorbed at the time of welding of the weld portion 15 between the handle 5 and the sheath 6. That is, by increasing quantity of heat absorbed of the weld portion 15 up to quantity of heat absorbed which is more than 100% of that of the weld portion 14 and 300% or less of it, it is possible to locate the position at a position 17 above a position 0.8% of the total axial length Ls of the sheath 6 below the upper end of the sheath 6. For this reason, by disposing the tab 13 located at the uppermost position at a position 0.8% of the total axial length Ls of the sheath 6 below the upper end of the sheath 6 in the axial direction of the tie-rod 4, even if a crack that occurred at the position 17 at which tensile residual stress is maximum in the sheath 6 lengthens toward the tie-rod 4, it is possible to prevent the tie-rod 4 from cracking in the same manner as embodiment 1.

The method to make quantity of heat absorbed of the weld portion 15 smaller than 300% of quantity of heat absorbed of the weld portion 14 can be applied to each control rod in embodiment 2 and embodiment 3. Furthermore, in a control rod in which a fall velocity limiter is mounted to the lower end portion of the tie-rod 4 instead of using a connector plate 8, it is possible to dispose the tab located at the uppermost position in the same manner as the control rod 1 and the control rod 1A. In this case, the lower end of the sheath is welded to the fall velocity limiter.

What is claimed is:

1. A control rod, comprising:
a tie-rod;
a handle mounted to an upper end portion of said tie-rod;
a connector plate mounted to a lower end portion of said tie-rod;
four sheaths having a U-shaped cross-section, welded intermittently to said tie-rod at a plurality of locations of a weld portion in the axial direction of said tie-rod, extending in four directions from said tie-rod, said sheaths having an upper end in the axial direction welded to said handle and a lower end in the axial direction welded to said connector plate; and
a neutron absorbing member disposed inside each of said sheaths,
wherein an upper end of said weld portion located at an uppermost position in the axial direction of said tie-rod among the plurality of said weld portions between said tie-rod and said sheath in the axial direction is disposed at a position within a range between 0.8 and 13% of total axial length Ls of said sheath below an upper end of said sheath.

2. The control rod according to claim 1,
wherein said upper end of said weld portion located at said uppermost position is disposed at a position within a range between 10 to 13% of said total axial length Ls below said upper end of said sheath.

3. A control rod, comprising:
a tie-rod;
a handle mounted to an upper end portion of said tie-rod;
a connector plate mounted to a lower end portion of said tie-rod;
four sheaths having a U-shaped cross-section and a plurality of projecting portions, which are welded at a weld portion to said tie-rod, protruding in a direction perpendicular to an axial core of said tie-rod being formed intermittently on a tie-rod-side end portion in an axial direction of said tie-rod, extending in four directions from said tie-rod, said sheaths having an upper end in the axial direction welded to said handle and a lower end in the axial direction welded to said connector plate; and
a neutron absorbing member disposed in each of said sheaths,
wherein an upper end of said weld portion located at an uppermost position in the axial direction of said tie-rod among said weld portions between said tie-rod and said plurality of projecting portions is disposed at a position within a range between 0.8 and 13% of a total axial length Ls of said sheath below the upper end of said sheath.

4. The control rod according to claim 3,
wherein said upper end of said weld portion located at said uppermost position is disposed at a position within a range between 10 and 13% of said total axial length Ls below said upper end of said sheath.

5. The control rod according to claim 1,
wherein said neutron absorbing member is a hafnium member.

6. The control rod according to claim 4,
wherein said neutron absorbing member is a hafnium member.

7. The control rod according to claim 1, wherein the sheaths are made of stainless steel and have a plurality of apertures therein, and wherein the neutron absorbing member is disposed inside each of said sheaths so as to form a gap between said neutron absorbing member and said sheath.

8. The control rod according to claim 3, wherein the sheaths are made of stainless steel and have a plurality of apertures therein, and wherein the neutron absorbing member is disposed inside each of said sheaths so as to form a gap between said neutron absorbing member and said sheath.

* * * * *